Sadamichi Someda
and Goro Hamano
Inventors.

By Wenderoth, Lind and Ponack
Attorneys

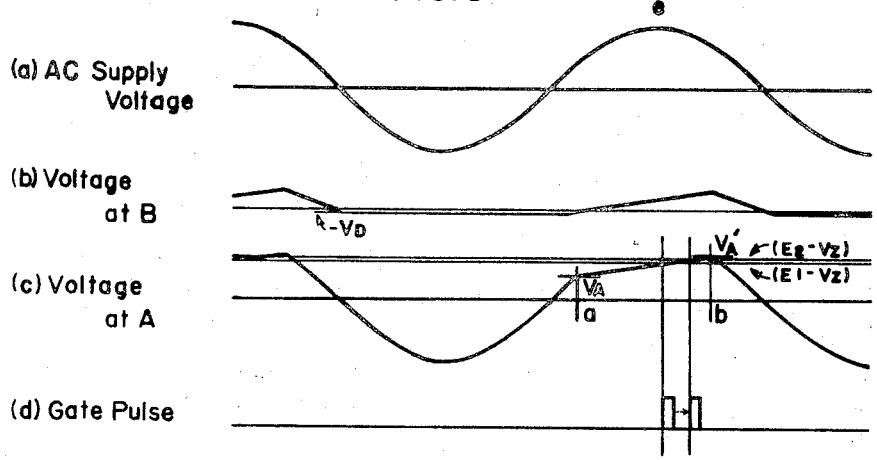
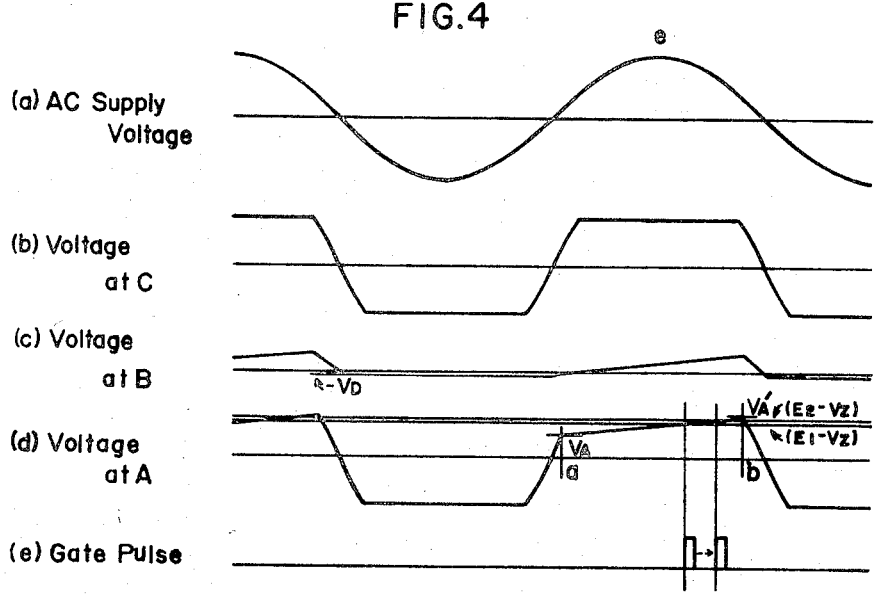

United States Patent Office 3,405,345
Patented Oct. 8, 1968

3,405,345
CONSTANT OUTPUT VOLTAGE
RECTIFYING SYSTEM
Sadamichi Someda, Hirakata-shi, Osaka-fu, and Goro Hamano, Matsubara-shi, Osaka-fu, Japan, assignors to Matsushita Electric Industrial Co., Ltd., Osaka, Japan
Filed Nov. 14, 1966, Ser. No. 594,085
Claims priority, application Japan, Dec. 2, 1965, 40/75,442; Dec. 3, 1965, 40/75,201
6 Claims. (Cl. 321—18)

This invention relates to a rectifying system for producing a substantially constant DC voltage regardless of any variation in the AC supply voltage and/or the load current, and more particularly it relates to a constant output voltage rectifying system having a rectifier with a controlling electrode, i.e. a gate, such as a silicon controlled rectifier.

In the following description, such a rectifier having a gate, such as a silicon controlled rectifier, will be referred to as an SCR for convenience.

Prior conventional constant output voltage rectifying systems having an SCR usually comprise a gate controlling circuit with a unijunction transistor. Such rectifying systems are generally complicated and expensive.

It is an object of this invention to provide a constant output voltage rectifying system which has a simple construction.

It is another object of this invention to provide a voltage rectifying system having an SCR and which produces a substantially constant DC output voltage regardless of any variation in the AC supply voltage and/or the load current.

It is a further object of this invention to provide a constant DC output voltage rectifying system which employs a blocking oscillator which controls an SCR.

These and other objects will be readily apparent to those skilled in the art from the following specification and accompanying drawings wherein:

FIG. 3 is a graphical representation of the waveform of the voltage at various parts of the circuit shown in FIG. 1;

FIG. 4 is a graphical representation of the waveform of the voltage at various parts of the circuit shown in FIG. 2;

Figure 1:
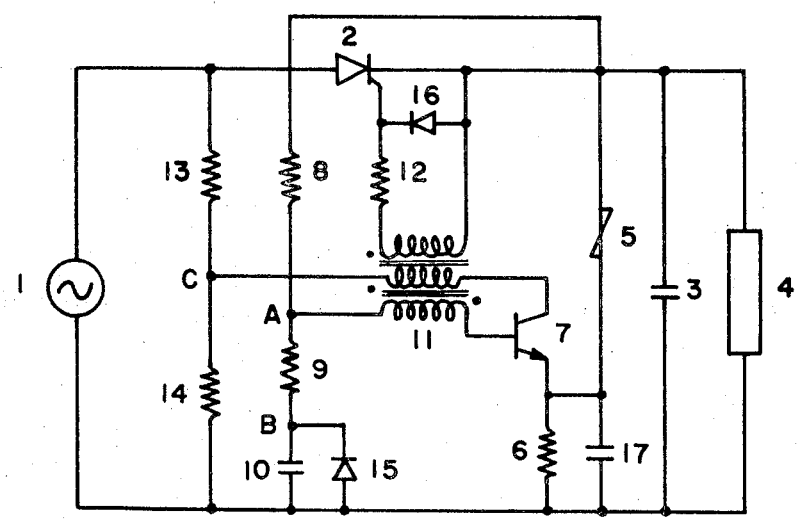
FIG. 1 is a circuit diagram of a constant voltage rectifying system with a condenser input filter in accordance with the invention.

Referring to FIG. 1, an AC power supply 1 is connected to the SCR 2 which rectifies the power from power supply 1. The output side of rectifier 2 is connected to a load 4 which has a condenser 3 connected in parallel with the load and acts as an input filter to smooth the output of the rectifier which is fed to the load 4. On the other hand, the rectifier output voltage is divided into two parts by an output voltage dividing circuit having a resistor 6 and a non-linear resistance element 5 such as a Zener diode or a varistor. The non-linear resistance element has a characteristic voltage-current curve such that the current increases rapidly when the voltage exceeds a predetermined voltage. The voltage from the resistor 6 is supplied to a transistor 7 as an emitter voltage. An integrating circuit is connected across the output side of SCR 2 and the output side of load 4, and is composed of series connected resistors 8 and 9, and a condenser 10, and a diode 15 in parallel with the condenser 10. A pulse transformer 11 is provided which has three windings, i.e., a primary, a secondary and a tertiary winding. The primary winding is connected between point A between resistances 8 and 9 of the integrating circuit and the base of transistor. The secondary winding is connected to the collector of the transistor, and the tertiary winding is connected in the gate circuit of the SCR 2 with a resistor 12 in series therewith and with a diode 16 connected in parallel therewith. The diode 16 is employed to prevent a reverse voltage across the gate and cathode of the SCR 2. When a voltage at a point A between the resistances 8 and 9 of the integrating circuit exceeds the emitter voltage, a blocking oscillator consisting of the pulse transformer 11 and the transistor 7 operates and supplies to the gate of the SCR 2 a pulse through the tertiary winding of the pulse transformer 11 and through the resistor 12. The pulse subsequently fires the SCR 2.

The voltages referred to hereinafter will be with reference to a voltage of the AC power supply 1 connected directly to the load 4 at zero potential.

The AC voltage being supplied to the SCR 2 is divided by an input voltage dividing circuit having resistors 13 and 14 connected in series, and having the secondary winding of transformer 11 connected to intermediate point C, shown in FIG. 1. The transistor 7 is thus supplied with a collector voltage which is the divided AC voltage. The blocking oscillator does not operate during the first positive half cycle of the AC supply voltage E. During a negative half cycle of the AC supply voltage $e$, the transistor 7 operates in a reverse manner such that the emitter thereof acts as a collector and the collector acts as an emitter, and is supplied with a DC current from the input voltage divider circuit. A condenser 17, coupled in parallel with resistor 6 is charged and keeps the emitter voltage negative during the next positive half cycle of the AC supply voltage $e$. During the successive positive half cycles, the blocking oscillator operates to produce a pulse in the gate circuit of the SCR which fires the SCR and consequently generates an output voltage.

With regard to voltages at points A and B, the transistor 7 operates in the reverse manner during a negative half cycle of the AC supply voltage $e$ and as a result, as seen in FIG. 3, the voltage at the point A is approximately equal to that at C. In addition, the voltage at B is blocked by the diode 15 and becomes $-V_D$ which is defined as a voltage drop across the diode 15. When the voltage at C exceeds, during an initial period of a positive half cycle, the voltgae $V_A$ determined by resistors 8 and 9 and a load voltage, the operation of the transistor 7 transfers from reverse to normal, that is, the emitter and the collector act as an emitter and a collector, respectively. With the passage of time, the voltage at B rises toward the load voltage along a curve according to a time factor determined by resistors 8 and 9 and the condenser 10, and simultaneously the voltage at A rises along a curve according to the same time factor. When the voltage at C falls and becomes the same as the voltage at A, i.e. $V_A'$, which is the voltage at A which has been rising during the period of the positive half cycle of the AC supply voltage, the operation of the transistor 7 is converted from normal to reverse, and then the voltages at A and B start to fall. In such a way, the voltage at A rises approximately linearly during the positive half cycle of the AC supply voltage during a time interval between a and b, as shown in FIG. 3.

The voltage across the resistor 6 is applied to the emitter of the transistor 7 and is equal to a load voltage less the voltage drop $V_z$ caused by the non-linear resistor 5, that is, $E_1-V_z$ for a load voltage of $E_1$. The voltage at A $t$=the time in reference to the time when the polarity of be approximately represented as follows:

$$C_A = \frac{R_2}{R_1+R_2}E_1 + \frac{R_1}{C(R_1+R_2)^2}E_1 t$$
$$= (K_1 + K_2 t)E_1 \tag{1}$$

where $R_1$=resistance of the resistor 8
$R_2$=resistance of the resistor 9
$C$=capacitance of the condenser 10

$$K_1 = \frac{R_2}{R_1+R_2}$$

$$K_2 = \frac{R_1}{C(R_1+R_2)^2}$$

$t$=the time in reference to the time when the polarity of the AC supply voltage changes from negative to positive.

The voltage at A is equal to the base voltage of the transistor 7 except during the time when the blocking oscillator is operating. At the time $$t = t_1 = \frac{1}{K_2}\left(1 - K_1 - \frac{V_z}{E_1}\right)$$

the base voltage of the transistor 7 exceeds the emitter voltage, the blocking oscillator generates a pulse which fires the gate of the SCR 2 and determine the conducting angle of the SCR 2. When the load voltage increases to $E_2$ because of a variation in the AC supply voltage and/or the load current, the emitter voltage of the transistor 7 becomes $E_2-V_z$ and the voltage A is approximately represented as follows:

$$V_A = (K_1 + K_2 t)E_2 \tag{2}$$

At the time $$t = t_2 = \frac{1}{K_2}\left(1 - K_1 - \frac{V_z}{E_2}\right)$$

the blocking oscillator operates. Now $t_1 < t_2$. Therefore, the load voltage can be controlled so that it is lower in such a way that the position of the pulse which fires the SCR 2 moves back and then the conducting angle of the SCR 2 decreases. Consequently the load can be provided with an approximately constant DC voltage depending upon the circuit parameters of the non-linear resistor 5, resistor 6, 8 and 9, and the condenser 10 by controlling the phase of the firing pulse for the SCR 2.

Figure 2:
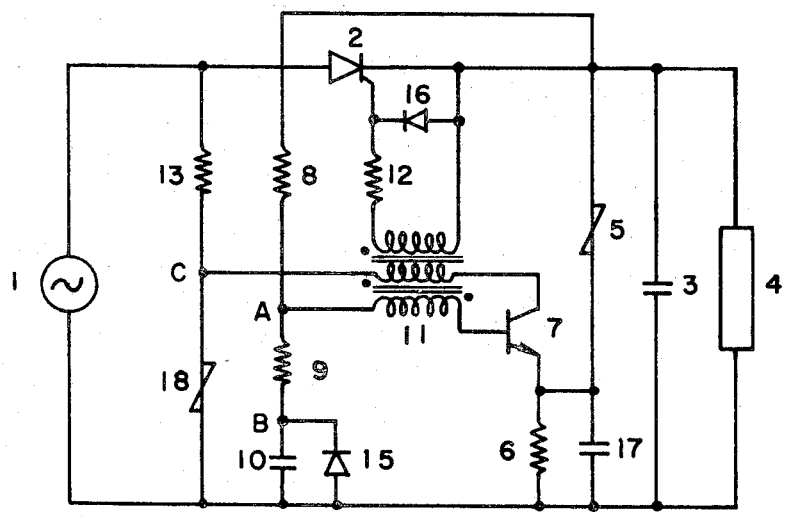
FIG. 2 is a circuit diagram of another constant voltage rectifying system having a condenser input filter in accordance with the invention.

FIG. 2 is a circuit diagram of a constant voltage rectifying system having a condenser input filter in accordance with the present invention. Voltage waveforms of the various parts of the circuit diagram of FIG. 2 are shown in FIG. 4. Referring to FIG. 2, reference character 18 designates a non-linear resistor such as a varistor or Zener diodes in a back-to-back connection in place of the resistor 14 of FIG. 1. The circuit is otherwise the same as that of FIG. 1 and the reference characters in FIG. 2, correspond to those of FIG. 1. A substantially constant voltage is supplied to the collector of transistor 7 during normal operation by causing the voltage at point C to have a nearly square waveform as shown in FIG. 4b. As a result, the amplitude of the gate firing pulse is approximately constant and the operation of the rectifying system can be stabilized.

A specific embodiment of this invention is set forth in the following example. However, this example should not be construed as limitative.

Figure 5:
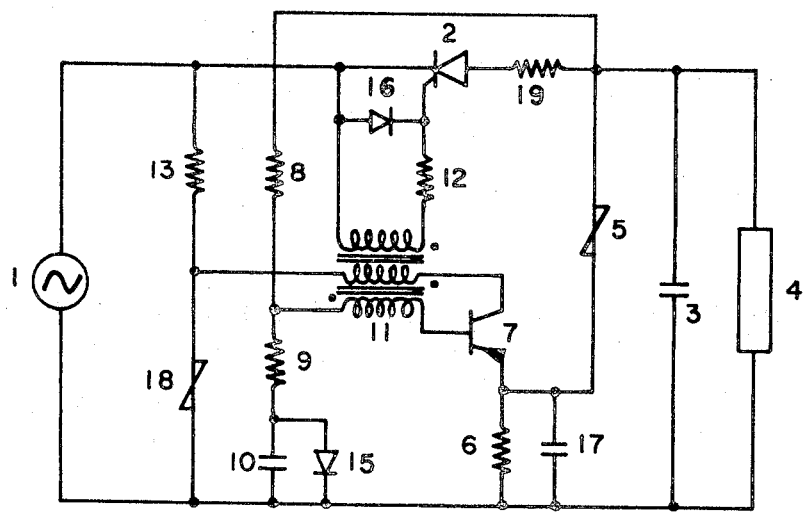
FIG. 5 is a circuit diagram of still another rectifying system according to the invention.

In connection with FIG. 5, which shows a circuit diagram having an additional resistor 19 and a condenser input filter 3, and has the direction of the rectifiers and diodes reversed, the elements have the following specified values:

| | | |
|---|---|---|
| SCR 2 | | 2F265 |
| Condenser 3 | microfarads | 2000 |
| Load 4 | ohms or infinite | 26 |
| Varistor 5 | volts at 10 ma | 15 |
| Resistor 6 | ohms | 330 |
| Transistor 7 | | 2SB176 |
| Resistor 8 | ohms | 68K |
| Resistor 9 | do | 18K |
| Condenser 10 | microfarad | 1 |
| Pulse transformer | | 125T–125T–250T |
| Resistor 12 | ohms | 100 |
| Resistor 13 | do | 6K |
| Diode 15 | | 0A95 |
| Diode 16 | | 0A95 |
| Condenser 17 | microfarads | 10 |
| Varistor 18 | volts at 10 ma | 22 |
| Resistor 19 | ohms | 19 |

Figure 6:
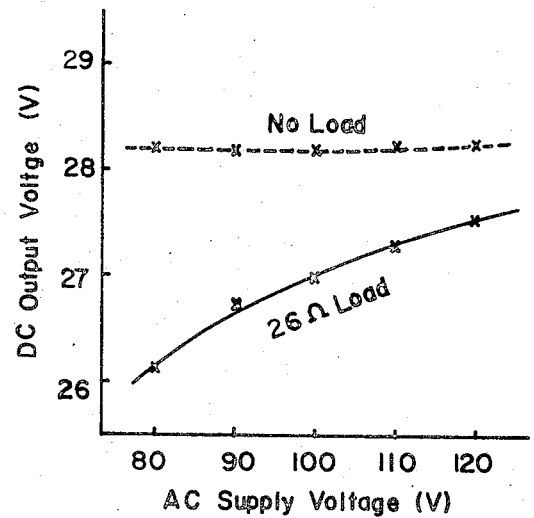
FIG. 6 is a graph showing the characteristic curve of the DC output voltage vs. AC supply voltage for the circuit of FIG. 5.

The characteristic curves of the circuit diagram of FIG. 5 are shown in FIG. 6 at a load resistance of 26 ohms and at no load. It will be readily understood from FIG. 6 that the rectifying system described can generate a DC output voltage of 27.2 v.±3.86% where the AC supply voltage is 100 v.±20% in accordance with the present invention.

What is claimed is:

1. A constant output voltage rectifying system, comprising a rectifier having an anode, a cathode and a gate means, said rectifier having an input side adapted to be coupled to a source of AC voltage; an input filter means coupled in series with the output side of said rectifier and adapted to be coupled in parallel with a load; an output voltage dividing circuit connected to the output side of said rectifier and adapted to be in parallel with a load and having a resistor, a condenser connected in parallel with said resistor, and a non-linear resistance element connected in series with said condenser, said non-linear resistance element having a voltage-current characteristic such that the current flowing therein increases rapidly when the voltage thereof exceeds a predetermined voltage; an input voltage dividing circuit coupled in parallel with said source of AC voltage and having two resistance means connected in series; an integrating circuit having a further condenser, a diode connected in parallel to said further condenser and two resistors connected in series with said diode, said integrating circuit being connected to the output side of said rectifier with said resistances between said condenser and said rectifier and adapted to be in parallel with a load, and a blocking oscillator having a transistor with an emitter, a collector and a base, and a pulse transformer having a primary, secondary and tertiary winding, one end of the primary winding being connected to said input voltage dividing circuit between said resistance means and the other end connected to said collector of the transistor, one end of the secondary winding being connected to said integrating circuit between said resistances and the other end being connected to the base of said transistor, and the tertiary winding of said transformer being connected across said gate means and said cathode of rectifier, said emitter of transistor being connected to said output voltage dividing circuit between said resistor and said non-linear resistance element therein.

2. A rectifying system as claimed in claim 1 in which said non-linear resistance element in said output voltage dividing circuit is a Zener diode.

3. A rectifying system as claimed in claim 1, in which said non-linear resistance element in said output voltage dividing circuit is a varistor.

4. A rectifying system as claimed in claim 1 in which one of said two resistance means in said input voltage dividing circuit is a non-linear resistance.

5. A rectifying system as claimed in claim 1 in which one of said two resistance means in said input voltage dividing circuit is a varistor.

6. A rectifying system as claimed in claim 1 in which one of said two resistance means in said input voltage dividing circuit is two Zener diodes connected in back-to-back relationship.

References Cited

UNITED STATES PATENTS

| | | | |
|---|---|---|---|
| 3,262,046 | 7/1966 | Clarke et al. | 323—22 XR |
| 3,299,340 | 1/1967 | Deelman | 321—18 |
| 3,340,460 | 9/1967 | Clarke et al. | 323—22 |
| 3,346,802 | 10/1967 | Biet | 323—22 XR |

LEE T. HIX, *Primary Examiner.*

W. M. SHOOP, *Assistant Examiner.*